United States Patent [19]
Melinat

[11] 4,395,883
[45] Aug. 2, 1983

[54] ELECTRIC BRAKE BOOSTER

[75] Inventor: Wolfgang Melinat, Dayton, Ohio

[73] Assignee: General Motors Corporation, Detroit, Mich.

[21] Appl. No.: 218,509

[22] Filed: Dec. 22, 1980

[51] Int. Cl.³ .............................................. F15B 7/00
[52] U.S. Cl. ........................................ 60/545; 60/594
[58] Field of Search ................. 60/545, 551, 552, 593, 60/594

[56] References Cited

U.S. PATENT DOCUMENTS 2,871,827  2/1959  Euga ....................................... 60/545
3,048,976  8/1962  Grigsby .................................. 60/545
4,224,832  9/1980  Prohaska ............................... 60/545

*Primary Examiner*—Abraham Hershkovitz
*Attorney, Agent, or Firm*—D. D. McGraw

[57] ABSTRACT

The brake pedal force is amplified by an electric motor acting through a gear set which converts rotary motion and torque from the motor into linear motion and force to energize the master cylinder piston. The push rod forces are sensed, amplified, reduced and modulated by electronic means. The electric motor disengages from the gear set at rest or if there is an electrical failure, so that there is a manual mode of operation available when necessary.

1 Claim, 1 Drawing Figure

U.S. Patent  Aug. 2, 1983  4,395,883
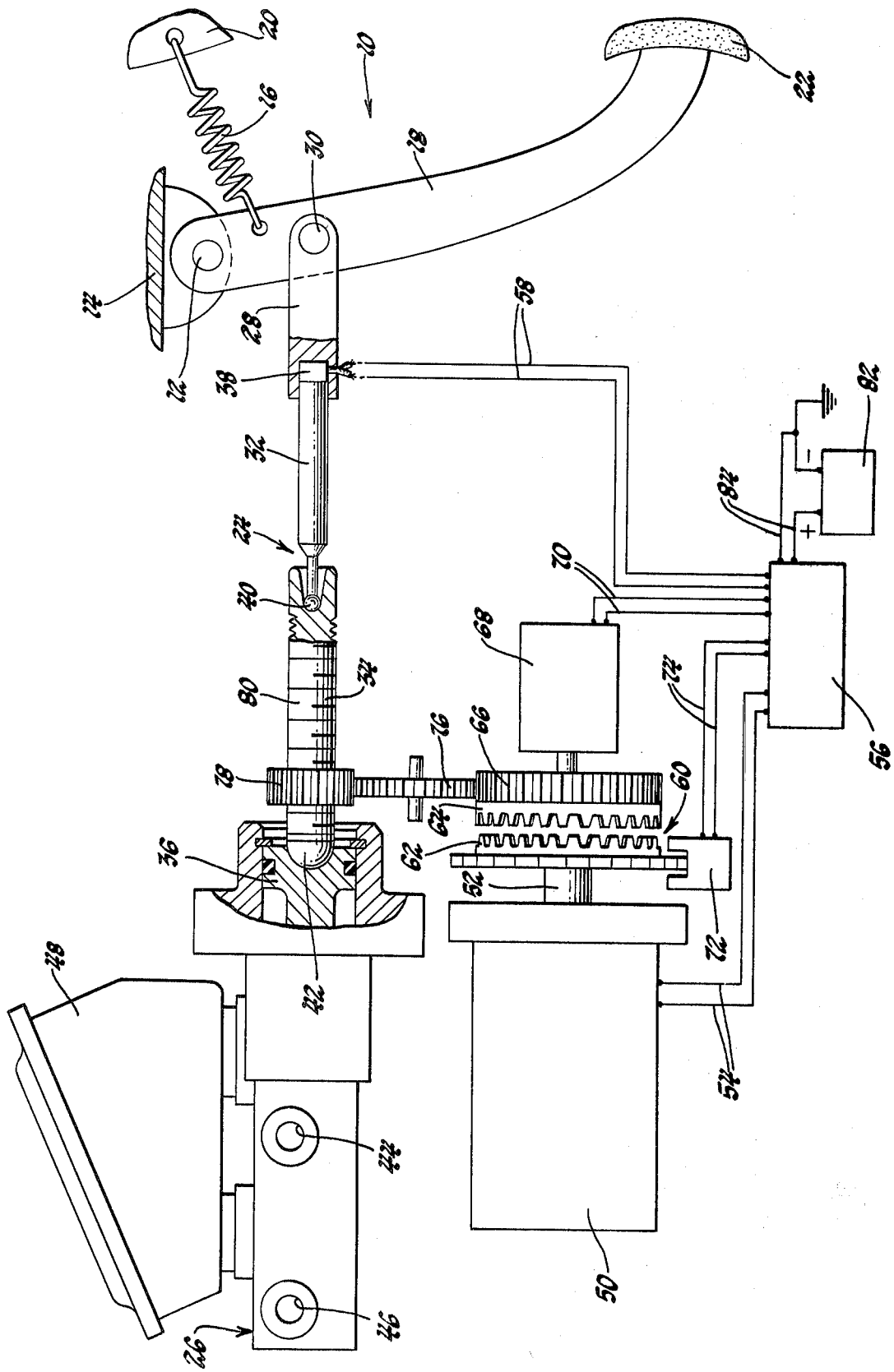

ELECTRIC BRAKE BOOSTER

The invention relates to an electrically powered vehicle brake booster operating a hydraulic master cylinder, and more particularly to a booster which converts rotational motion and torque into linear motion and force. The electrically powered brake assembly will permit a brake pedal force build-up of 200 lbs. within 0.1 seconds. It is possible to obtain a fully supported line pressure in the hydraulic brake circuitry within 0.4 seconds. By using a master cylinder of a suitable bore diameter of diameters the booster is capable of developing at least 1500 p.s.i. at an acceptable amount of piston travel within the above mentioned 0.4 seconds. The boosted brake pedal forces will rise from 0 lbs. to about 65 lbs. at booster runout. These performance figures are considered to be desirable, but may be modified if different figures are required.

The booster operates only upon demand. Hydraulic pressure modulation is possible with the electric booster on a continuous basis. Should the electric motor powering the booster fail to operate electrically, the master cylinder may be manually actuated to apply and release the vehicle wheel brakes without electric power assist. A solenoid is used to operate a power clutch to separate the power and no-power apply modes. Suitable controls are provided by force sensing means such as a piezo electric crystal or some other suitable pressure transducer, and suitable circuitry including control logic in the nature of a microprocessor.

The booster amplifies brake pedal forces by use of power from an electric motor. A gear set converts rotational motion and torque from the electric motor into linear motion and linear force to energize the hydraulic master cylinder to apply the vehicle wheel brakes. The electric motor disengages from the gear set at rest or during electrical failure. Push rod forces are sensed, amplified, reduced and modulated by electronic means. The electric booster has a no-power override arrangement.

IN THE DRAWING

The single FIGURE is a schematic disclosure of a brake control system embodying the invention, with parts broken away and in section.

The system includes several major components. The brake pedal assembly 10 is typical of brake pedals in common use and is suitably pivotally mounted at 12 on a fixed portion 14 of the vehicle. A brake pedal return spring 16 is so attached to the pedal arm 18 and a fixed portion 20 of the vehicle as to urge the brake pedal arm toward the brake pedal assembly brake release position. The pedal arm has a pedal 22 on its free end for operation by the foot of the vehicle operator.

A push rod mechanism 24 connects the pedal arm 18 and the master cylinder assembly 26. Push rod mechanism 24 includes an input push rod 28 pivotally secured at 30 to the brake pedal arm 18, an intermediate push rod 32 having one end connected to push rod 28, and an output push rod 34 connecting intermediate push rod 32 and the piston 36 of the master cylinder assembly 26. The force transmitting connection between rods 28 and 32 is provided through a force sensing means 38, which may be a piezo electric crystal or some other suitable force sensitive signal generating transducer. The force sensing means 38 is capable of sensing the force exerted between push rods 28 and 32 and generating signals reflecting that force. The connection 40 between push rod 32 and push rod 34 is illustrated as being of the ball-and-socket type so as to allow for limited axial angular movements between the two as the brake pedal assembly is stroked during normal operation. The forward end 42 of push rod 34 is illustrated as being rounded to fit a mating cavity in the rear end of piston 36. Push rod 34 is substantially in axial alignment with piston 36 of master cylinder assembly 26.

The master cylinder assembly is illustrated as being a typical dual master cylinder having two pressure chambers and one or more outlets for each pressure chamber. One outlet for each pressure chamber is illustrated with outlet 44 conducting hydraulic fluid to one hydraulic brake circuit of the vehicle and outlet 46 conducting hydraulic brake fluid to the other hydraulic brake circuit of the vehicle. Master cylinder assembly 26 is provided with a suitable fluid reservoir 48.

The electrical portion of the brake booster assembly includes an electric motor 50 which rotates the motor output shaft 52 when the motor is electrically energized. Power to motor 50 is provided through the motor circuit 54 which leads from the control logic 56. This logic may be a suitable microprocessor. It receives force responsive signals from the force sensing means 38 through the signal circuit 58. These signals are indicative of the pedal force exerted from the brake pedal assembly 10 on the input push rod 28 and the intermediate push rod 32 since the force sensing means is located between these two push rods. The signals have characteristics indicating whether or not such brake pedal force is increasing, decreasing or stable. When the push rod forces are increasing, the electric motor shaft 52 will rotate in one direction, for example clockwise in the configuration illustrated. If the push rod forces sensed by force sensing means 38 are decreasing, the microprocessor control logic 56 will reverse the electric motor polarity through motor circuit 54 and the output shaft 52 will rotate in the opposite direction. If the push rod forces sensed by force sensing means 38 are stable, the microprocessor control logic will so control electric motor 50 that there is no rotation of output shaft 52.

A clutch assembly 60 is provided, with the clutch input unit 62 being mounted on output shaft 52 of electric motor 50 so as to be driven thereby as shaft 52 rotates. The clutch output unit 64 is mounted on a drive gear 66. A clutch engaging and disengaging solenoid 68 is so connected to gear 66 and clutch output unit 64 that when solenoid unit 68 is energized, the gear and clutch unit move to engage unit 64 with unit 62 in driving relation. Solenoid 68 is controlled by the microprocessor control logic 56 through the signal circuit 70. A rotational sensor 72 senses rotation of the clutch input unit 62 whenever output shaft 52 is rotated. Sensor 72 is preferably a Hall Effect position sensor which when activated sends electric signals through sensor circuit 74 to the microprocessor control logic 56. Gear 66 drives an idler gear 76 which in turn drives a gear 78 mounted on a non-locking high-lead screw 80 on output push rod 34.

The vehicle operator applies brake applying force to the brake pedal 22 to pivot pedal arm 18 and transmit the force to input push rod 28. This push rod force is sensed by the force sensing means 38 which generates electric signals in signal circuit 58 connected to the microprocessor control logic 56. Inside the control logic 56 is a register of transistors which open an electric circuit from the battery 82, or other suitable electrical power source, through the power circuit 84 as a result of the force sensing means signals, continuously modulating and limiting the amperage that can be drawn from the battery 82. As a result electric current from the battery 82 will flow through the power circuit 84, the control logic 56, and the motor circuit 54 into the split-series wound electric motor 50.

As the brake apply force through push rod 28 increases, the signal delivered through signal circuit 58 to the control logic 56 and the power provided through motor circuit 54 causes motor 50 to turn in the clockwise direction. Therefore the clutch input unit 62 rotates clockwise and the sensor 72 is activated, sending signals through sensor circuit 74 to the control logic 56. These signals will open a circuit from the battery 82 through the power circuit 84 and control logic 56 to energize solenoid 68 through signal circuit 70. The solenoid remains energized as long as there is an electrical signal emanating from the force sensing means 38. Energization of solenoid 68 causes the engagement of clutch unit 64 with clutch unit 62.

If there should be an electrical or mechanical failure in the electric motor 50, preventing motor shaft 52 from initial rotation, no electric current will flow from sensor 72 through circuit 74 to the control logic 56. Therefore clutch 60 will not engage, and the entire brake apply will be in the manual apply mode of operation.

When clutch 60 is engaged by action of solenoid 68 the rotation and torque from the electric motor output shaft 52 is transmitted through the clutch and gear 66 to gear 78 through idler gear 76. Gear 78 converts the rotational motion and torque to a linear motion and force through output push rod 34 by moving screw 80 linearly. The linear motion and force of output push rod 34 are imparted to master cylinder piston 36, resulting in the build-up of hydraulic pressure in the pressurizing chambers of the master cylinder 26 and the transmittal of the hydraulic braking pressure to the vehicle wheel brakes through outlets 44 and 46.

Not all of the forces generated by the operator through the brake pedal assembly 10 and into the input push rod 28 will be boosted. In order to create pedal feel, 0 lbs. to 65 lbs. of brake pedal force will be allowed to pass through the push rod 28 into the push rod 32, and then through the output push rod 34 to the master cylinder piston 36. These direct pass-through forces are controlled by the microprocessor control logic 56 and may be either linear or non-linear as desired for optimum brake pedal feel. After booster run-out and for no-power operations, all brake pedal forces will flow from the brake pedal assembly 10 through the push rods 28, 32 and 34 into piston 36. The brake pedal return spring 16 is provided to assist in the return of brake pedal arm 18 during no-power operations.

When the force sensed for force sensing means 38 is stable, the stable signal may cause the microprocessor control logic 56 to so control the electric motor 50 and solenoid 68 so that the clutch 60 is disengaged and the motor is not rotating. When the force sensing means 38 senses a decreasing brake pedal force through the push rod 28, the electric motor 50 will be rotated counterclockwise, clutch 60 will be engaged and the power drive through gears 66, 76 and 78 and screw 80 will cause a powered release of the master cylinder piston 36. In brake apply and release under power, the amount of boosted force supplied is modulated so that the master cylinder assembly is operated to the extent and in the manner required by the brake operator to obtain the desired braking.

The embodiments of the invention in which an exclusive property or privilege is claimed are defined as follows:

1. An electrically controlled and powered brake booster and master cylinder assembly comprising:
   a master cylinder actuatable to generate hydraulic brake actuating pressures commensurate with the amount of force delivered thereto;
   a master cylinder actuator including
      a brake pedal for manual operation,
      and push rod means connecting said brake pedal to said master cylinder to deliver manually generated force from said brake pedal to said master cylinder,
      said push rod means having force sensing means sensing the force exerted from said brake pedal on said push rod means and generating force responsive signals signifying the strength and rate of change of the force exerted from said brake pedal on said push rod means,
      said push rod means including a force transmitting section between said master cylinder and said force sensing means and movable linearly to actuate and release said master cylinder;
   driving means connected to said force transmitting section for selectively driving said force transmitting section and including
      an electric motor having a rotatable output shaft,
      clutch means between said electric motor output shaft and said force transmitting section and having clutch engaging and disengaging means operatively sensitive to said force responsive signals to engage said clutch means only at and above a predetermined minimum force sensed by said force sensing means,
      and means sensing the rotational movement of the output shaft of said electric motor and generating rotation responsive signals accordingly;
   and control logic means receiving said force and rotation responsive signals and controlling said clutch engaging and disengaging means and said electric motor to use the power of said electric motor to drive said force transmitting section in accordance with the strength and rate of change of the force from said brake pedal and rotational characteristics of said motor output shaft to boost the manually generated force actuating said master cylinder.

* * * * *